(12) United States Patent
McLaughlin et al.

(10) Patent No.: US 8,623,441 B2
(45) Date of Patent: Jan. 7, 2014

(54) METHOD AND APPARATUS FOR CONTROLLING BREWED BEVERAGE QUALITY

(75) Inventors: James M. McLaughlin, Seattle, WA (US); Quan H. Nguyen, Renton, WA (US); Christopher D. Collier, Monroe, WA (US); Eileen M. Nall, Corvallis, OR (US); Lucas A. Marks, Portland, OR (US); Carrie M. Rebhuhn, Corvallis, OR (US)

(73) Assignee: Concordia Coffee Company, Inc., Bellevue, WA (US)

( * ) Notice: Subject to any disclaimer, the term of this patent is extended or adjusted under 35 U.S.C. 154(b) by 163 days.

(21) Appl. No.: 13/050,852

(22) Filed: Mar. 17, 2011

(65) Prior Publication Data

US 2011/0212229 A1 Sep. 1, 2011

Related U.S. Application Data

(63) Continuation-in-part of application No. 13/038,195, filed on Mar. 1, 2011, now Pat. No. 8,247,010.

(60) Provisional application No. 61/309,401, filed on Mar. 1, 2010, provisional application No. 61/315,847, filed on Mar. 19, 2010.

(51) Int. Cl.
*A47J 31/44* (2006.01)
*A23F 5/26* (2006.01)

(52) U.S. Cl.
USPC ............. 426/433; 426/231; 99/289 R; 99/285

(58) Field of Classification Search
USPC .................................. 426/231; 99/289 R, 285
See application file for complete search history.

(56) References Cited

U.S. PATENT DOCUMENTS

| 332,199 A | 12/1885 | Henderson |
|---|---|---|
| 2,658,645 A | 11/1953 | Harris |

(Continued)

FOREIGN PATENT DOCUMENTS

| EP | 0 508 703 A2 | 10/1992 |
|---|---|---|
| EP | 1 867 257 A1 | 12/2007 |

(Continued)

OTHER PUBLICATIONS

International Search Report and Written Opinion mailed Nov. 25, 2011, issued in corresponding International Application No. PCT/US2011/028906, filed Mar. 17, 2011, 8 pages.

(Continued)

*Primary Examiner* — Anthony Weier
(74) *Attorney, Agent, or Firm* — Christensen O'Connor Johnson Kindness PLLC

(57) ABSTRACT

A brewing system and method are shown for brewing a beverage, such as coffee or tea. The system includes an inline sensor or sensor array that intercepts the dispensing stream and measures the time dependent properties of the brewed liquid at a particular location as the liquid is dispensed. In a particular embodiment, the total dissolved solids is measured to produce a coffee signature, which is sent to a controller that uses the time-dependent data to perform one or more of the following: evaluate the quality of the brewed liquid, control the brewing process for subsequent brewing cycles; identify the blend or brand of brewed product; and/or determine when maintenance is needed or advisable for the brewing system.

23 Claims, 14 Drawing Sheets

(56) References Cited

U.S. PATENT DOCUMENTS

| | | |
|---|---|---|
| 2,733,731 A | 2/1956 | Turak |
| D185,939 S | 8/1959 | Frick |
| D188,154 S | 6/1960 | Frick |
| D192,114 S | 1/1962 | Brosnan |
| 3,086,446 A * | 4/1963 | Totten ............................ 99/283 |
| 3,249,196 A | 5/1966 | Maxwell |
| D206,218 S | 11/1966 | Turiace, Jr. |
| 3,385,569 A | 5/1968 | Bookout |
| 3,482,989 A * | 12/1969 | Cornelius et al. ............. 426/433 |
| 3,671,273 A | 6/1972 | Gunter |
| D235,009 S | 4/1975 | Thompson |
| 3,920,299 A | 11/1975 | Propst |
| D253,953 S | 1/1980 | Salsbury |
| 4,211,342 A | 7/1980 | Jamgochian |
| D264,214 S | 5/1982 | Bowen |
| 4,438,683 A | 3/1984 | Bartfield |
| D288,267 S | 2/1987 | Meyer |
| 4,649,809 A | 3/1987 | Kanezashi |
| D289,129 S | 4/1987 | Syverson |
| 4,715,274 A | 12/1987 | Paoletti |
| 4,797,296 A | 1/1989 | Meier |
| 4,815,633 A | 3/1989 | Kondo |
| D302,221 S | 7/1989 | Suttles |
| 4,873,916 A | 10/1989 | Piscaer |
| D308,686 S | 6/1990 | Frost |
| 4,974,500 A | 12/1990 | Boyd |
| D313,724 S | 1/1991 | Piñon |
| D316,794 S | 5/1991 | Volgger |
| 5,033,645 A | 7/1991 | Shannon |
| D318,973 S | 8/1991 | Hasslacher |
| 5,056,686 A | 10/1991 | Jarrett |
| 5,116,632 A | 5/1992 | Miller |
| D329,857 S | 9/1992 | Laituri |
| 5,207,148 A | 5/1993 | Anderson |
| D337,475 S | 7/1993 | Seiffert |
| 5,230,277 A | 7/1993 | Bianco |
| 5,233,915 A | 8/1993 | Siccardi |
| D340,611 S | 10/1993 | Hoover |
| 5,255,593 A * | 10/1993 | Bunn et al. ...................... 99/280 |
| 5,303,639 A | 4/1994 | Bunn |
| 5,309,822 A | 5/1994 | Sager |
| 5,316,781 A | 5/1994 | Lüssi |
| D347,755 S | 6/1994 | Houston |
| 5,341,957 A | 8/1994 | Sizemore |
| 5,344,050 A | 9/1994 | Ficken |
| 5,353,692 A | 10/1994 | Reese |
| 5,393,540 A | 2/1995 | Bunn |
| D357,062 S | 4/1995 | Schreiner |
| 5,423,245 A | 6/1995 | Midden |
| D365,490 S | 12/1995 | Pomeroy |
| 5,579,678 A | 12/1996 | Goerndt |
| 5,650,186 A | 7/1997 | Annoni |
| 5,733,591 A | 3/1998 | Goerndt |
| D395,975 S | 7/1998 | Munoz |
| D396,987 S | 8/1998 | Seiffert |
| D398,432 S | 9/1998 | Yerkes |
| 5,911,810 A | 6/1999 | Kawabata |
| 5,941,163 A | 8/1999 | Park |
| D413,757 S | 9/1999 | Muñoz |
| D414,371 S | 9/1999 | Seiffert |
| D417,118 S | 11/1999 | Pomeroy |
| 6,019,032 A | 2/2000 | Arksey |
| 6,098,524 A | 8/2000 | Reese |
| 6,099,878 A | 8/2000 | Arksey |
| 6,135,169 A | 10/2000 | Sandei |
| 6,182,555 B1 | 2/2001 | Scheer |
| 6,205,909 B1 | 3/2001 | Giannelli |
| 6,237,811 B1 | 5/2001 | Ford |
| D443,398 S | 6/2001 | Mount |
| 6,240,829 B1 | 6/2001 | McGarrah |
| D445,292 S | 7/2001 | Sowden |
| 6,253,664 B1 | 7/2001 | Giannelli |
| 6,253,667 B1 | 7/2001 | Lüssi |
| D449,198 S | 10/2001 | Cahen |
| D455,596 S | 4/2002 | Boos |
| 6,419,120 B1 | 7/2002 | Bertone |
| 6,634,280 B2 | 10/2003 | Sowden |
| D481,901 S | 11/2003 | Daniels |
| D486,346 S | 2/2004 | Jönsson |
| 6,726,950 B2 | 4/2004 | Yuzawa |
| D495,915 S | 9/2004 | Cahen |
| 6,994,231 B2 | 2/2006 | Jones |
| 7,021,206 B2 | 4/2006 | Eckenhausen |
| 7,066,079 B2 | 6/2006 | Sager |
| D527,939 S | 9/2006 | Smith |
| 7,147,131 B2 | 12/2006 | Sher |
| D536,204 S | 2/2007 | Isett |
| D544,287 S | 6/2007 | Joss |
| D556,493 S | 12/2007 | Isett |
| 7,322,275 B2 | 1/2008 | Lüssi |
| 7,507,430 B2 | 3/2009 | Stearns |
| 7,537,138 B2 | 5/2009 | Saggin |
| 7,654,191 B2 * | 2/2010 | Greenwald et al. ............. 99/275 |
| 7,673,555 B2 | 3/2010 | Nosler |
| 7,717,026 B1 * | 5/2010 | Lassota .......................... 99/283 |
| 2003/0145736 A1 | 8/2003 | Green |
| 2004/0168465 A1 | 9/2004 | Renken |
| 2005/0172833 A1 | 8/2005 | Ioannone |
| 2006/0034987 A1 | 2/2006 | Thakur |
| 2009/0158937 A1 | 6/2009 | Stearns |

FOREIGN PATENT DOCUMENTS

| | | | |
|---|---|---|---|
| EP | 1867257 A1 | | 12/2007 |
| EP | 2140788 A1 | | 1/2010 |
| JP | 3-39114 | * | 2/1991 |
| JP | 5-120545 | * | 5/1993 |
| JP | 2001106261 | * | 4/2001 |
| JP | 2008-543458 A | | 12/2008 |
| KR | 10-0219010 B1 | | 9/1993 |
| KR | 10-029010 B1 | | 9/1999 |
| KR | 10-2005-0044530 A | | 5/2005 |
| KR | 10-2008-0068664 A | | 7/2008 |
| WO | 2007/027206 A2 | | 3/2007 |
| WO | 2007/035877 A2 | | 3/2007 |

OTHER PUBLICATIONS

International Search Report and Written Opinion mailed Dec. 13, 2011, issued in corresponding international Application No. PCT/US2011/032361, filed Apr. 13, 2011, 8 pages.

Nguyen, Q.H., et al., "Accelerated Low Pressure Brewer," U.S. Appl. No. 13/038,195, filed Mar. 1, 2011.

* cited by examiner

METHOD AND APPARATUS FOR CONTROLLING BREWED BEVERAGE QUALITY

CROSS-REFERENCES TO RELATED APPLICATIONS

This application is a continuation-in-part of U.S. application Ser. No. 13/038,195, filed Mar. 1, 2011, now U.S. Pat. No. 8,247,010, which claims the benefit of U.S. Provisional Application No. 61/309,401, filed Mar. 1, 2010. This application also claims the benefit of U.S. Provisional Application No. 61/315,847, filed Mar. 19, 2010. The disclosures of these priority patent applications are expressly incorporated herein by reference in their entireties.

BACKGROUND

Coffee preparation, that is, the process of producing a beverage using the coffee bean, typically requires four basic steps be performed: (i) the raw coffee beans are roasted; (ii) the roasted coffee beans are ground; (iii) the ground coffee beans are brewed, i.e., mixed with hot water for a period of time; and (iv) the liquid coffee beverage is separated from the unwanted grounds. Additional steps may include, for example, adding milk, sweetener, flavorings, and/or other additives to the brewed liquid. Typically in much of the world, the roasted coffee beans are purchased by the user, who then performs the remaining steps. Various coffee brewing systems are known in the art, ranging from personal brewers such as drip coffee makers and French presses, to large commercial systems used for producing a dizzying array of flavored espresso-based beverages.

Ground coffee may be brewed in a number of different ways that may be categorized into four basic methods (as discussed in http://en.wikipedia.org/wiki/Coffee_preparation). The four methods are (1) boiling, for example placing ground coffee into a cup and pouring hot water over the grounds, allowing the grounds to settle; (2) steeping, for example, placing ground coffee into a French press and waiting a few minutes before depressing the filtered plunger and pouring the brewed liquid into a cup; (3) filtration, for example drip brewing wherein the ground coffee is placed in a filter holder and hot water drips onto the coffee grounds into a carafe or the like; and (4) pressure methods, for making espresso wherein hot water typically between 91° C. and 96° C. is forced under a pressure of between eight and nine atmospheres through a lightly packed matrix or "puck" of finely ground coffee.

The different brewing methods have various disadvantages. For example, boiling and steeping methods require some time, typically 4-7 minutes, to produce an optimally flavored beverage. Filtration methods may be quicker, but do not produce the full bodied coffee that many consumers prefer, and/or may require more coffee grounds to produce an acceptable flavor. Espresso may be relatively quick, but requires relatively high pressures (8-9 atmospheres). Moreover, the high pressures are typically produced by steam, and the relatively high temperatures and pressures produce a very strong and distinctive flavor that some consumers may not prefer.

Similar considerations apply to other brewable beverages, such as teas and the like, which may be similarly brewed.

There is a need, therefore, for a system and method for brewing coffee and other beverages that retains the benefits associated with brewing coffee grounds that are suspended in the heated water, with the rapid brewing associated with pressure brewing methods.

It is important to consumers and producers alike, to be able to produce a consistent, high-quality brewed beverage, for example a coffee beverage. The quality of a brewed coffee depends on a number of different and often related parameters. The quality of a brewed coffee will typically depend on both the amount of coffee soluble components in the brewed liquid, and which of the coffee soluble components are present. If the coffee is under-brewed, for example, certain of the desirable flavor and aroma components may not be obtained from the coffee bean, resulting in an inferior product. Conversely, if the coffee is over-brewed, certain undesirable bitter soluble components may be dissolved in the liquid, again resulting in an inferior product. Conventionally, the quality of a brewed coffee liquid is characterized by measuring the total dissolved solids in the brewed beverage, and determining the percent of available solubles that were extracted from the coffee. However, the rate of extraction is not constant, so prior art quality determinations are made on the final brewed product. It may be difficult or inconvenient to obtain these parameters in the final product, which is typically provided to the end user, and may include flavorings or other additives at the time of dispensing.

In prior art brewing apparatus, objective evaluation of the quality of the brewed product is typically only obtained, if at all, periodically, for example daily, weekly, monthly or the like. Therefore producers of coffee products may not have timely notification if an adjustment to the brewing cycle, or maintenance of the brewing apparatus, is needed. It would be particularly advantageous to be able to automatically monitor and adjust the quality of the brewed product, so that the "gold cup" standard can be consistently achieved, thereby satisfying customer expectations and building brand loyalty.

In prior art brewing apparatus it is also difficult or impossible to identify whether particular blends or brands of coffee are being used with the apparatus, which may be important when the apparatus is provided to customers based on an expectation that a particular coffee brand will be used.

For these and additional reasons, it would be beneficial to have brewing apparatus with a means for regularly monitoring the quality of a brewed beverage without having to analyze the final brewed product.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A brewing system is disclosed that includes a source of brewable product, for example ground coffee or tea, a source of heated water, and a brewing chamber for brewing the product in the heated water. An electronic system is provided for controlling the operation of the brewing system, preferably including a computer processor, communications facilities, and related data storage ability. The system further includes an inline sensor positioned to intercept the fluid stream expelled from the brewing chamber, and to measure a one or more properties of the fluid stream, wherein the sensor generated time-dependent data corresponding to the measured property or properties. For example, the sensor may measure the total dissolved solids in the brewed liquid. The data is communicated to the controller, which may use the data to continuously or periodically adjust the brewing parameters, for example, by adjusting the grinder time to adjust the amount of brewable product received into the brewing chamber.

In a particular embodiment, the time-dependent sensor data is used to identify the brewable product, to identify the particular brand or blend of coffee used.

In a particular embodiment, the controller uses the sensor data to monitor the operation of the brewing system, and to identify if there is a need for service or maintenance.

In a particular embodiment, the brewing system includes a coffee grinder, and a conductivity sensor, and the controller uses the time-dependent data from the conductivity sensor to control the operation of the grinder.

In a particular embodiment the brewing system includes a cylindrical brewing chamber, a lower piston that is attached to a first linear actuator and sealably engages an open bottom end of the brewing chamber, an upper piston assembly that is attached to a second linear actuator and sealably and releasably engages an open upper end of the brewing chamber, and a sliding arm assembly that is attached to a third linear actuator and is operable to slide over the upper open end of the brewing chamber.

In a particular embodiment the brewing system includes a display for displaying the total dissolved solids or another quality of the brewed beverage based on property of the brewed liquid measured by the sensor.

In another aspect of the invention a method for producing a brewable beverage is disclosed that includes providing a quantity of brewable product and heated water to a brewing chamber to produce a brewed liquid, forcing the brewed liquid from the chamber in a fluid stream, and measuring a property of the brewed liquid at a fixed location as the fluid stream flows by the fixed location to generate a time-dependent data set for the fluid stream corresponding to the measured property.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
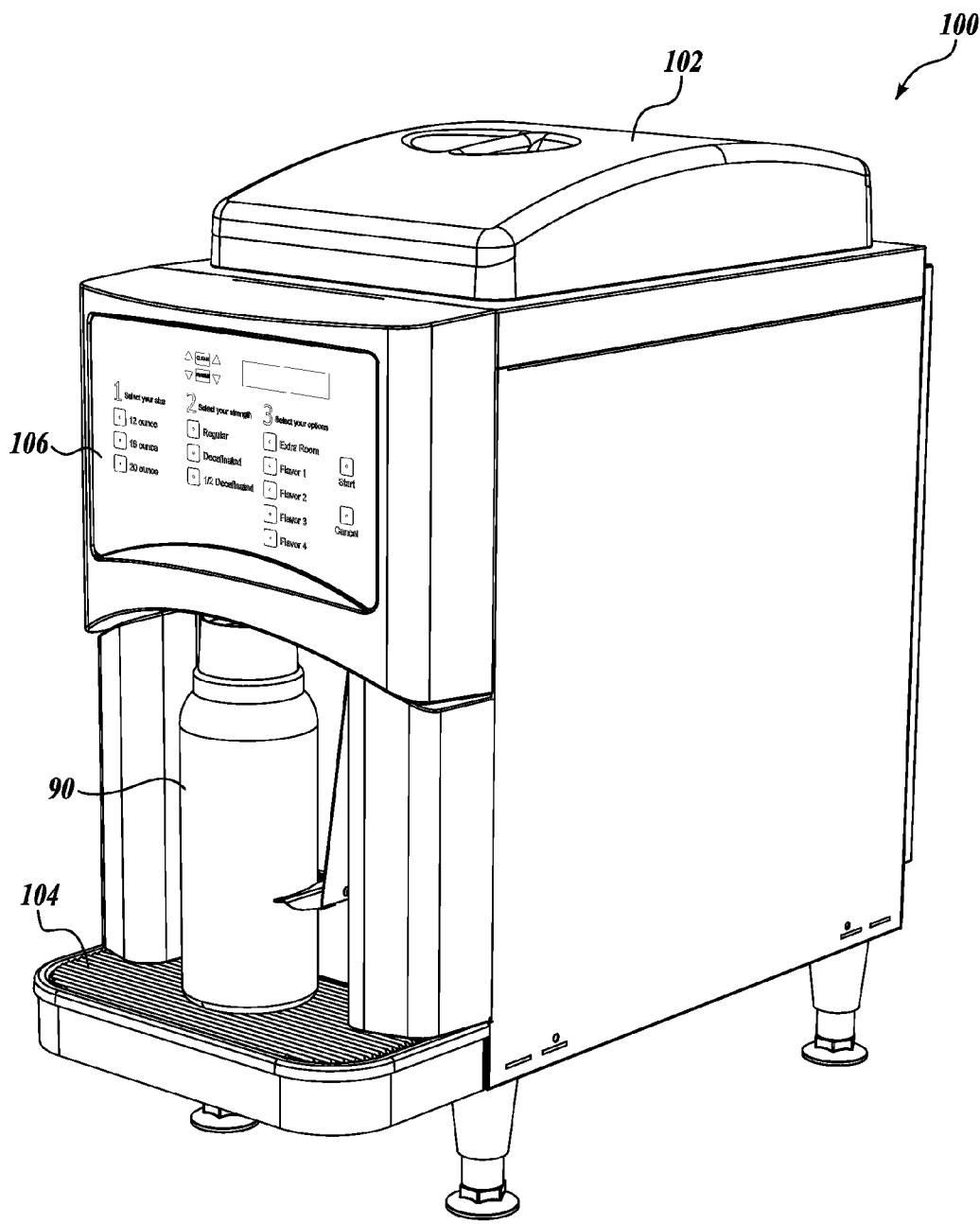
FIG. 1 is a front-right perspective environmental view of a beverage brewing system in accordance with the present invention.

A particular embodiment of a brewing system in accordance with the present invention will now be described with reference to the figures, wherein like numbers indicate like parts. One or more of the present inventors is also an inventor for related and co-pending U.S. patent application Ser. No. 13/038,195, filed on Mar. 1, 2011, the disclosure of which is hereby incorporated by reference, in its entirety. FIG. 1 shows a perspective environmental view of a brewing system 100 in accordance with the present invention, having a hopper 102 disposed at a top of the system 100, and holding a carafe 90 in the dispensing area 104. A beverage selection and/or control panel 106 is shown generally above the dispensing area 104. It is contemplated that the hopper 102 may define a plurality of selectable compartments containing different brewable materials, for example different types or species of coffee beans. For example, the beverage selection panel 106 may give users the option to select a beverage size (e.g., 12, 16, or 20 ounces), among beverage choices (e.g., regular coffee, decaffeinated coffee, tea), and/or among flavoring or other additive options (e.g., creamer, sweetener, syrup flavors). The beverage selection panel 106 may also allow selection of a parameter of the brewed beverage (e.g., strength), and/or provide feedback regarding a quality of the brewed beverage.

The brewing system 100 may be suitable for brewing various brewable materials, such as ground coffee, tea, or the like. Although the following discussion may refer specifically to coffee brewing systems in places, it will be understood that the teachings of the present invention may similarly be applied to other brewing systems, including tea brewing systems.

Figure 2:
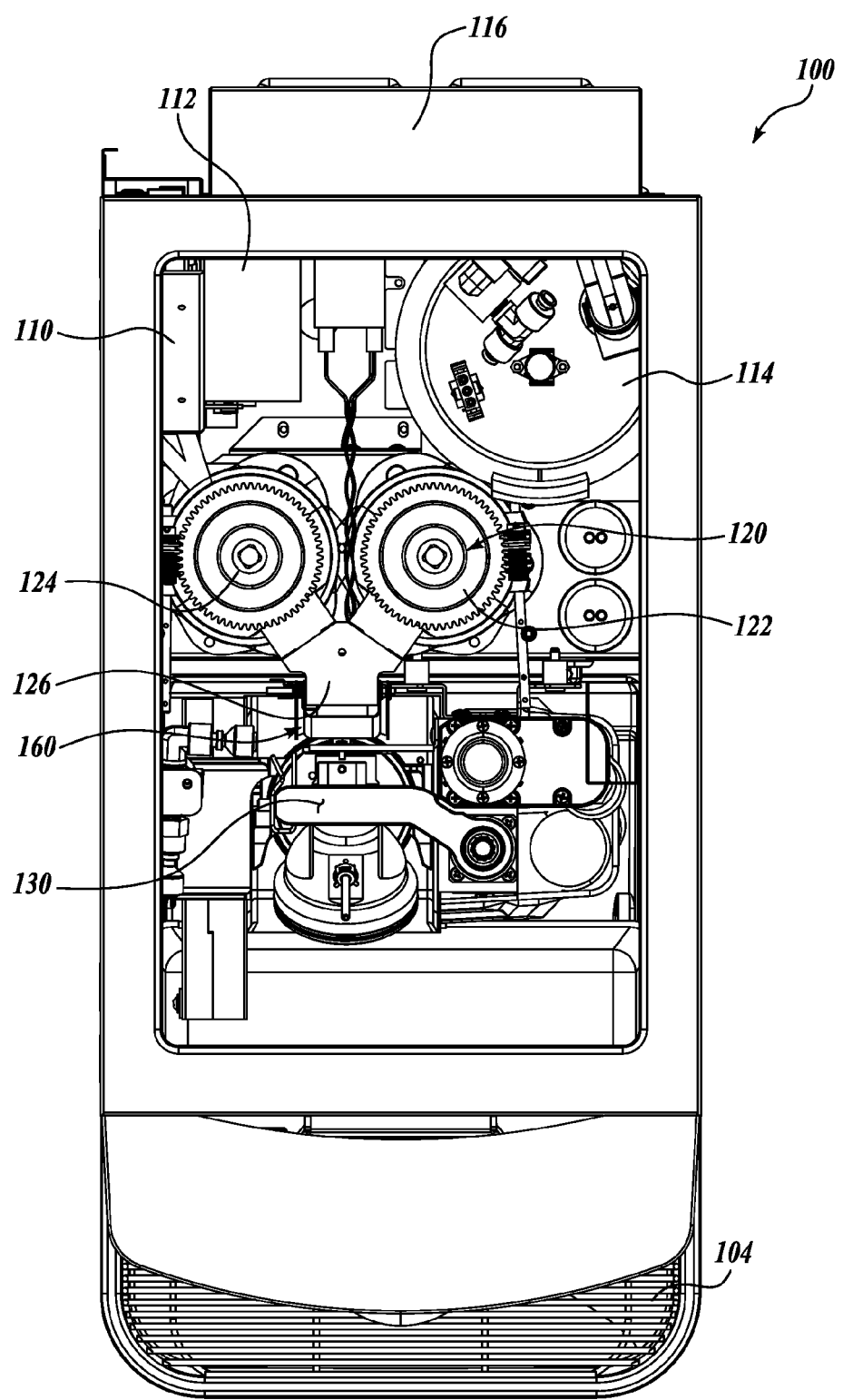
FIG. 2 is a plan view of the beverage brewing system shown in FIG. 1, with some outer panels removed to expose interior components.

FIG. 2 shows a top view of the brewing system 100 with the hopper 102 and certain other portions removed to expose internal components. In this embodiment the brewing system 100 includes a brew group controller 110, a power supply 112, an optional flavoring controller 116 and a water heater/reservoir 114. A grinder assembly 120 comprising two grinders 122, 124 is positioned to receive product, for example coffee beans, from the hopper 102. The brewable product from the grinder assembly 120 is expelled through a shared chute base 126, and a chute assembly 160.

Figure 3:
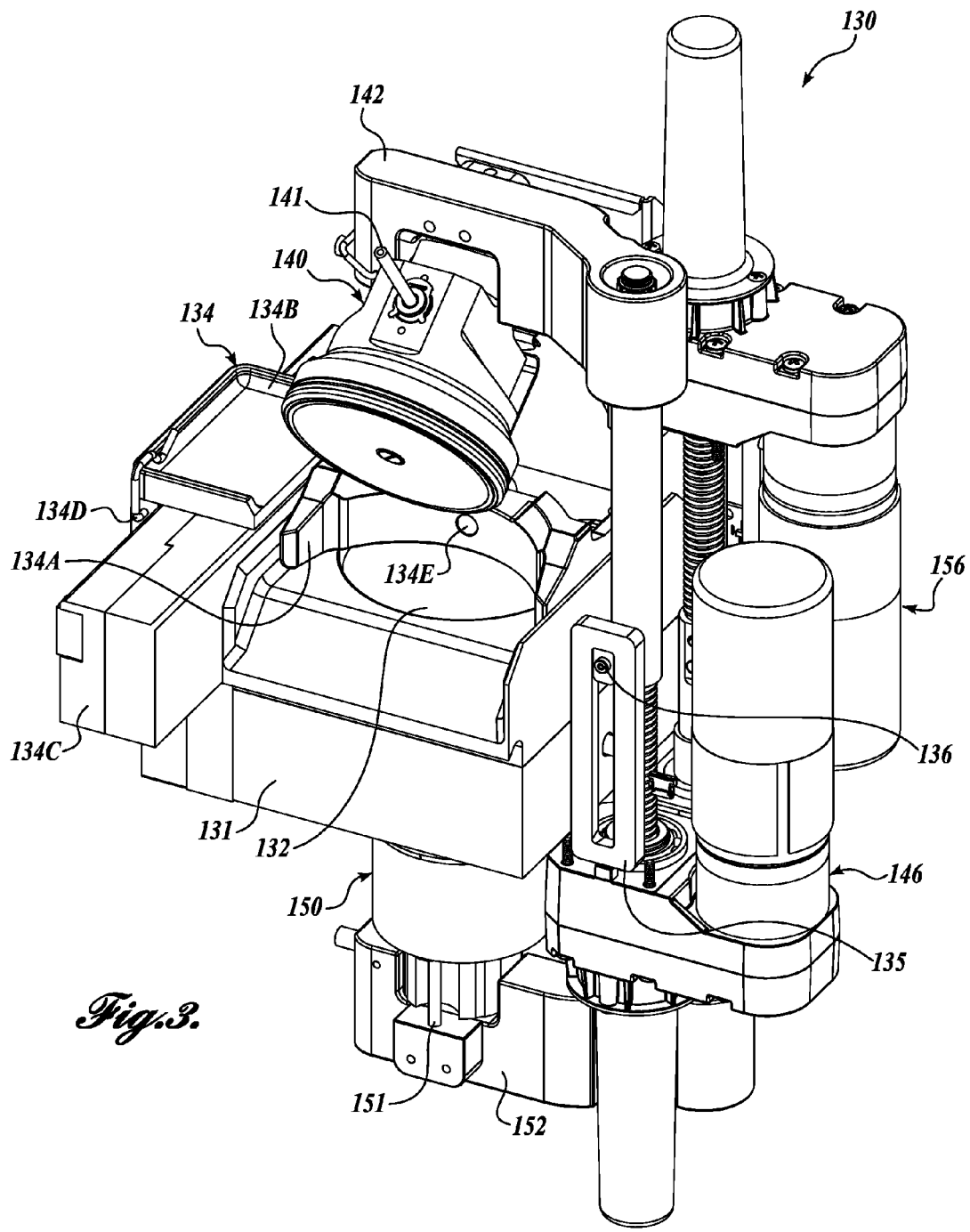
FIG. 3 is a perspective view showing the brew group for the beverage brewing system shown in FIG. 1.

A brew group 130, shown in more detail in FIG. 3, is plumbed to receive hot water from the reservoir 114 and configured to receive brewable product from the grinding assembly 120. The brew group 130 includes a cylindrical brewing chamber 132, currently formed with a cylindrical sleeve disposed in a block assembly 131. The brewing chamber 132 is positioned to receive coffee grounds from the grinder assembly 120. In a currently preferred embodiment the brewing chamber defines a cylindrical volume between 2 inches and 3.5 inches in diameter, and a height between 2.5 inches and 5.0 inches. However, the brew group including brewing chamber 132 may readily be scaled to other sizes.

A sliding arm assembly 134 is slidably disposed over the brewing chamber 132, and is configured to push spent grounds or other brewed material off of the block assembly 131. In this embodiment the sliding arm assembly 134 includes a C-shaped arm 134A that extends across the width of the brewing chamber 132. The lower transverse edges of the C-shaped arm 134A are beveled. The arm 134A is drivably attached to a drive arm subassembly 134B. The drive arm subassembly 134B is movable linearly by an actuator 134C such that the C-shaped arm 134A is controllably movable across the upper surface of the block assembly 131. In the current embodiment, the actuator 134C comprises an electric motor-driven worm gear system with a toothed belt (not shown) that drivably engages the drive arm subassembly 134B.

Although not required for the present invention, the actuator 134C, and the piston actuators discussed below, are preferably configured with encoders (not shown) to enable precise positioning of the various elements. In a current embodiment rotational sensors/encoders are provided on the drive motors, and linear sensors/encoders are provided on the drive shafts, to enable precise positional control. Exemplary sensors are Hall-effect sensors with magnets.

A novel aspect of the illustrated sliding arm assembly 134 is the flexibility of the assembly, which provides a very reliable and effective mechanism for removing spent coffee grounds, as discussed below. In particular, the drive arm subassembly 134B slides along an upper surface of the actuator 134C, and includes a spring-loaded hinged connection 134D. A portion of the drive arm subassembly 134B extends behind the C-shaped arm 134A and is connected thereto with a pivot 134E. The flexibility of the sliding arm assembly 134 provides a very reliable mechanism for scraping spent grounds from the block assembly 131.

The brew group 130 includes an upper piston assembly 140 that is pivotably attached to an upper support arm 142, which is attached to a first linear actuator 146. The upper piston assembly 140 is movable between a load position (shown in FIG. 3) and a brewing position wherein the upper piston assembly 140 sealingly engage the brewing chamber 132 from an open top end of the chamber 132. The upper piston assembly 140 includes a dispensing tube 141 that dispenses the brewed beverage. The upper piston assembly 140 is described in more detail below.

The brew group 130 further includes a lower piston assembly 150 that is pivotably attached to a lower support arm 152, which is pivotably attached to a second linear actuator 156. The lower piston assembly 150 is sized and configured to sealingly engage the brewing chamber 132 from an open bottom end of the chamber 132, and includes a water supply tube 151.

The first and second linear actuators 146, 156 further include a guide slot 135 and anti-rotation pin 136 (only one anti-rotation device 135, 136 visible in FIG. 3) to assure the corresponding piston moves only longitudinally.

Figure 4:
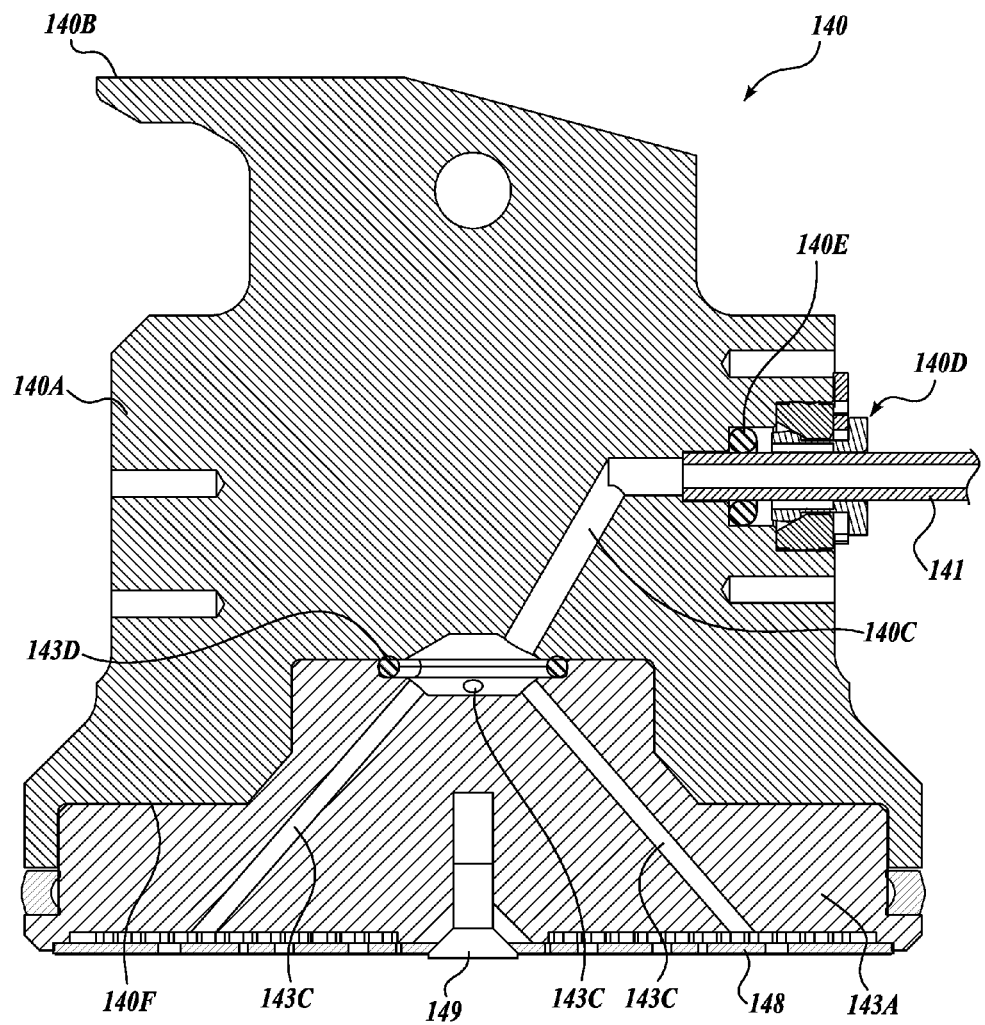
FIG. 4 is a section view of the upper piston assembly shown in FIG. 3.

FIG. 4 shows a cross section of the upper piston assembly 140. The upper piston assembly 140 defines a piston having a first piston member 140A that is configured to pivotably attach to the upper support arm 142, and includes a fixed lever arm 140B to facilitate pivoting the piston assembly 140. A channel 140C is defined from a front face of the first piston member 140A and extending to a lower face. The dispensing tube 141 is attached to the first piston member 140A with a half-cartridge fitting 140D and O-ring 140E, to fluidly and sealingly engage the channel 140C. A shaped recess 140F defines the lower face of the first piston member 140A.

A second piston member 143A is configured to nest with and engage the shaped recess 140F. A plurality of channels 143C extend through the second piston member 143A and fluidly engage the channel 140C in the first piston member 140A. An O-ring 143D is provided to seal the connection between the channel 140C and the plurality of channels 143C. The channels 140C, 143C therefore cooperatively define a plurality of fluid paths that extend from the lower face of the second piston member 143A to the dispensing tube 141. A perforated plate 148 is removably attached to the bottom face of the second piston member 143A with a fastener 149.

Figure 5:
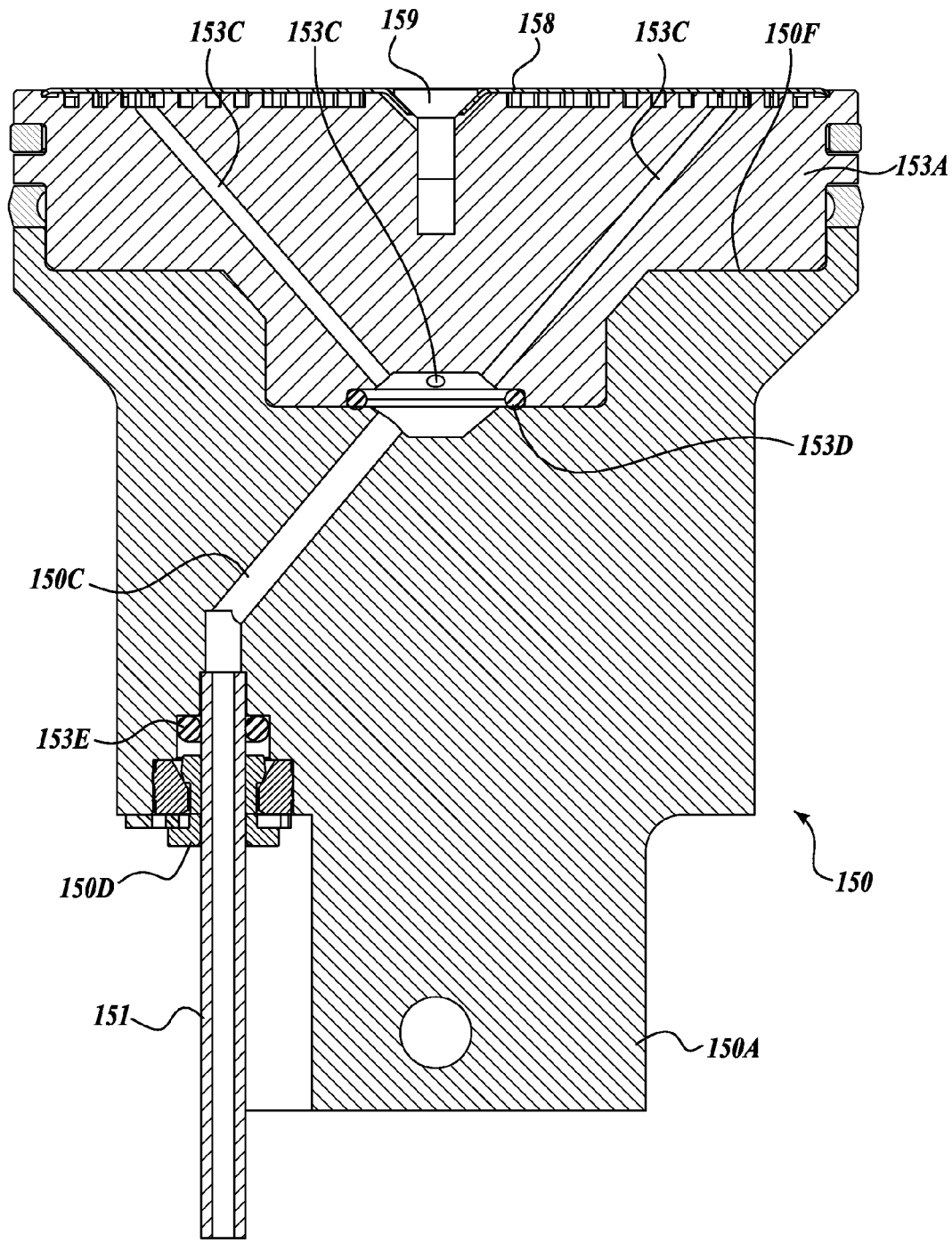
FIG. 5 is a section view of the lower piston assembly shown in FIG. 3.

FIG. 5 shows a section view of the lower piston assembly 150. The lower piston assembly 150 includes a first piston member 150A configured to attach to the lower support arm 152. A channel 150C extends from a lower opening in the first piston member 150A to an upper face. The water supply tube 151 is attached to the first piston member 150A with a half-cartridge fitting 150D and O-ring 150E to fluidly and sealingly engage the channel 150C. A shaped recess 150F defines the lower face of the first piston member 150A.

A second piston member 153A is configured to nest with and engage the shaped recess 150F, and is removably attached thereto. A plurality of channels 153C extend through the second piston member 153A and fluidly engage the channel 150C in the first piston member 150A. An O-ring 153D is provided to seal the connection. The channels 150C, 153C therefore cooperatively define a plurality of flow paths that extend from the water supply tube 151 to the upper face of the second piston member 153A. A perforated plate 158 is removably attached to the second piston member 153A with a fastener 159.

The operation of the brew group 130 will now be described with reference to FIGS. 6A-6E, which illustrate the brew group 130 in isolation with a portion of the brew chamber 132 cut away, at various stations in the brew cycle. It is contemplated that the operation of the components of the brewing system 100 will be automatically controlled by the controller 110 and related systems, in response to the specific beverage request entered by a user from the beverage selection panel 106. Alternate means for entering a beverage request are also contemplated, for example using remote beverage entering system that is in signal communication with the brewing system 100, wirelessly (e.g., using RF, Bluetooth®, or the like) or using a card reading system, or the like.

Figure 6A:
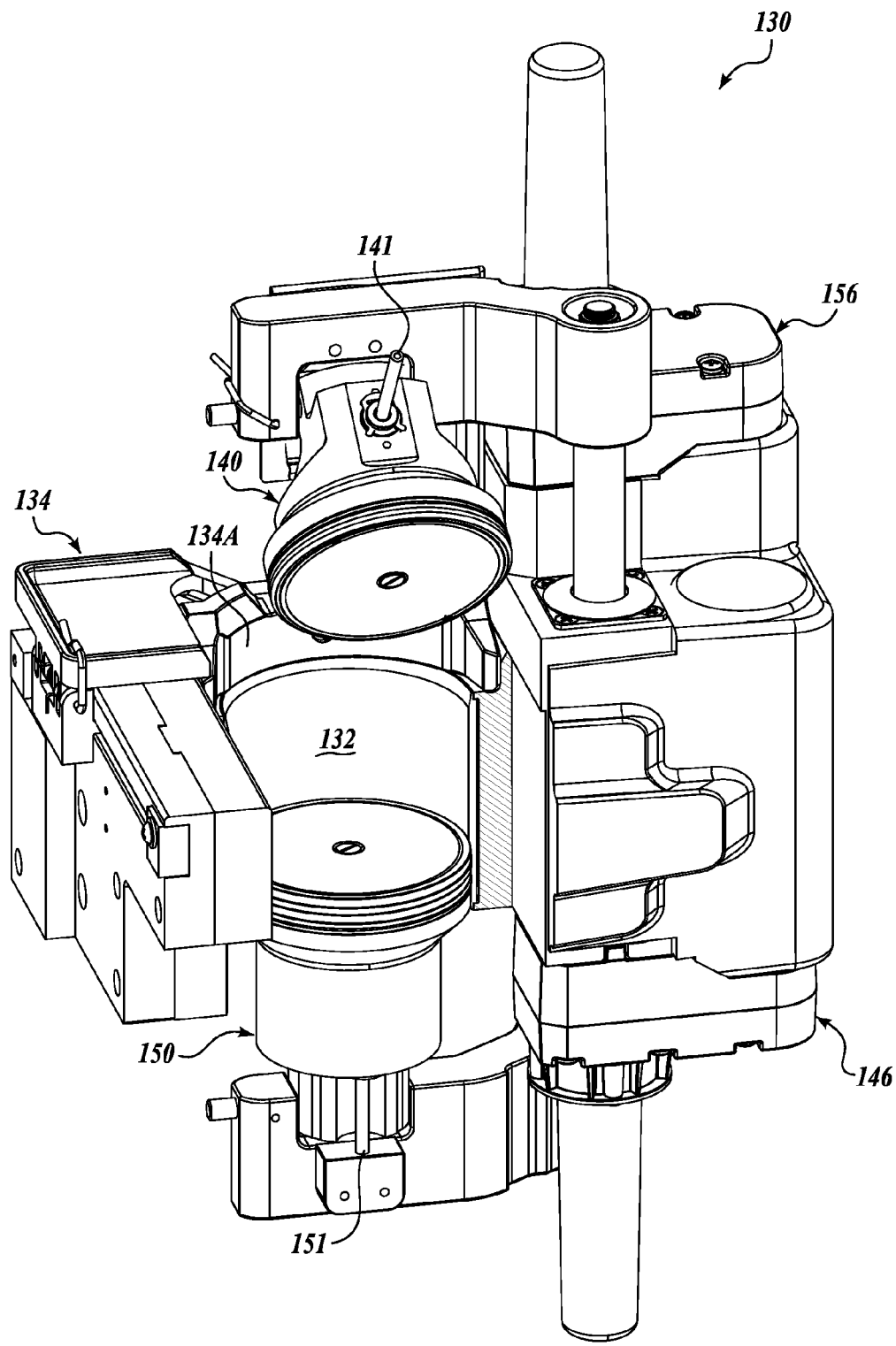
FIGS. 6A, 6B, 6C, 6D, and 6E illustrate the brew group shown in FIG. 3 with the brewing chamber partially cut away, in various positions during the brewing cycle.

FIG. 6A shows the brew group 130 in position to receive brewable material, for example ground coffee from the grinder assembly 130. The lower piston assembly 150 sealingly engages the brewing chamber 132, positioned near the lower end of the chamber 132 by the second linear actuator 156. The upper piston assembly 140 is positioned upwardly away from the brewing chamber 132 by the first linear actuator 146, and pivoted to the load position above. Brewable material from the grinder assembly 120 is received into the brewing chamber 132.

Figure 6B:
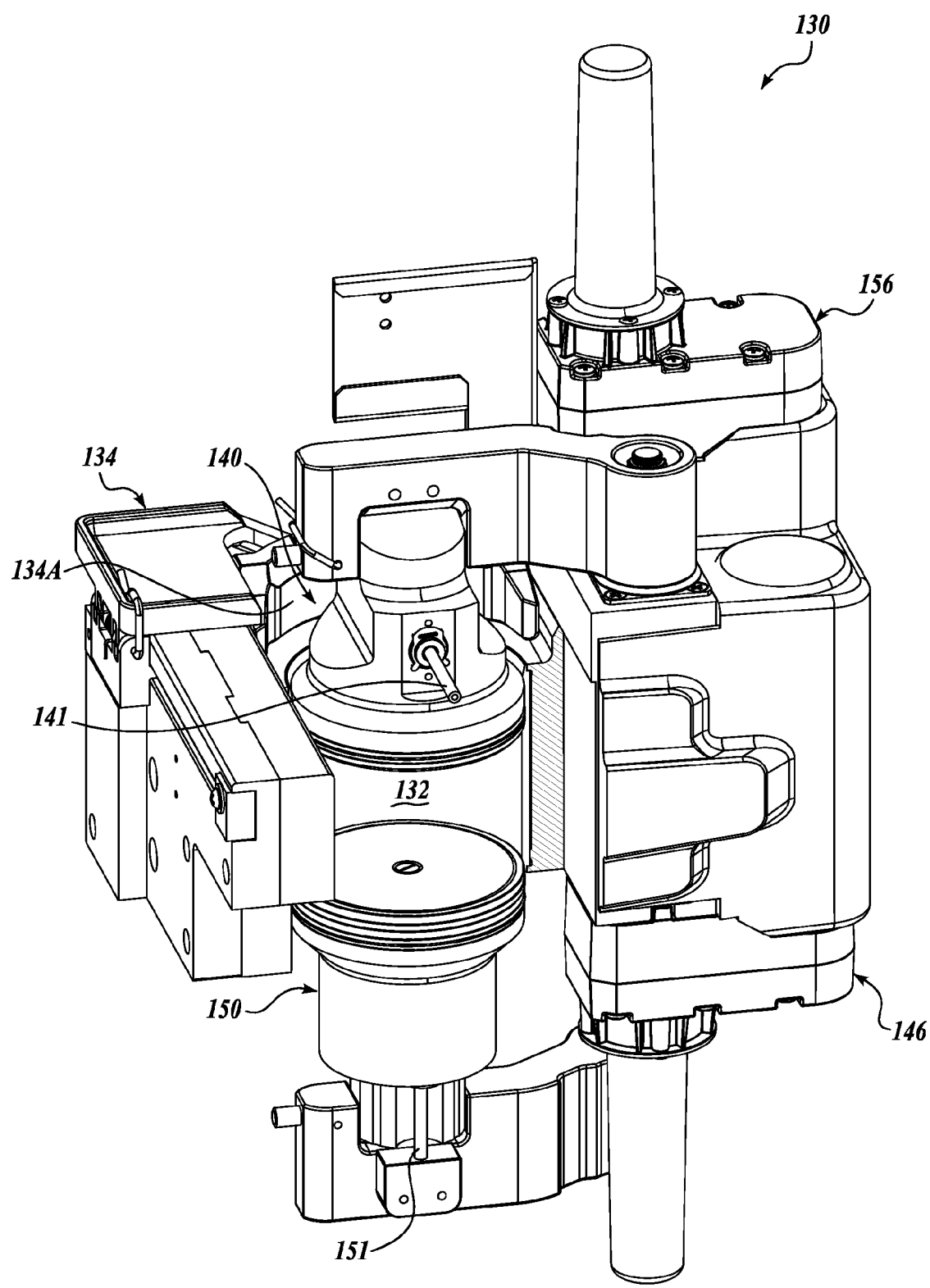

As illustrated in FIG. 6B, the upper piston assembly 140 is moved to the brewing position to sealingly engage an upper end of the brewing chamber 132. As the upper piston assembly 140 is moved downwardly, it pivots to a vertical orientation or brew position. It is contemplated that the vertical position of the lower piston assembly 150 may also be adjusted, for example to accommodate the selected beverage size. For example, if a "small" or "8-ounce" beverage was selected, the lower piston assembly 150 may be moved upwardly in the brewing chamber 132. Valves (not shown) are positioned to close liquid egress from the brewing chamber 132, and to fluidly connect the heated water reservoir 114 to the water supply tube 151. This initiates the flow of hot water through the lower piston assembly 150 and into the brewing chamber 132. Preferably the water pressure is maintained at a desired value to optimize brewing quality and/or speed. Preferably a nominal pressure in the range between 10 and 100 psig is maintained, and more preferably in the range of 20-60 psig for coffee or in the range of 10-50 psig for other brewable product such as tea.

When the desired amount of water and the desired pressure has been provided, the water supply may optionally be stopped to provide a desired time for brewing. It will be appreciated by persons of skill in the art that the pressurized brewing chamber 132, although lower in pressure than espresso makers, will nevertheless accelerate the brewing process as compared to prior art systems wherein the brewing chamber is not pressurized. In the current embodiment, the pressurized water supply from the heater/reservoir is regulated to provide a desired pressure. It is contemplated that the regulated pressure may be between 10 and 100 psig.

In a first embodiment or mode of operation of the system 100, the water flow is resumed (or maintained) and a dispensing valve (not shown) is opened to initiate the flow of brewed beverage through the upper piston assembly channels 140C, 143C to the dispensing tube 141, and then ultimately dispensed to the cup, carafe, or other container 90. In an alternative second mode of operation, the lower piston assembly 150 is moved upwardly through the brewing chamber 132, to cause the brewed liquid flow through the upper piston assembly 140 and to the dispensing tube 141.

Figure 6C:
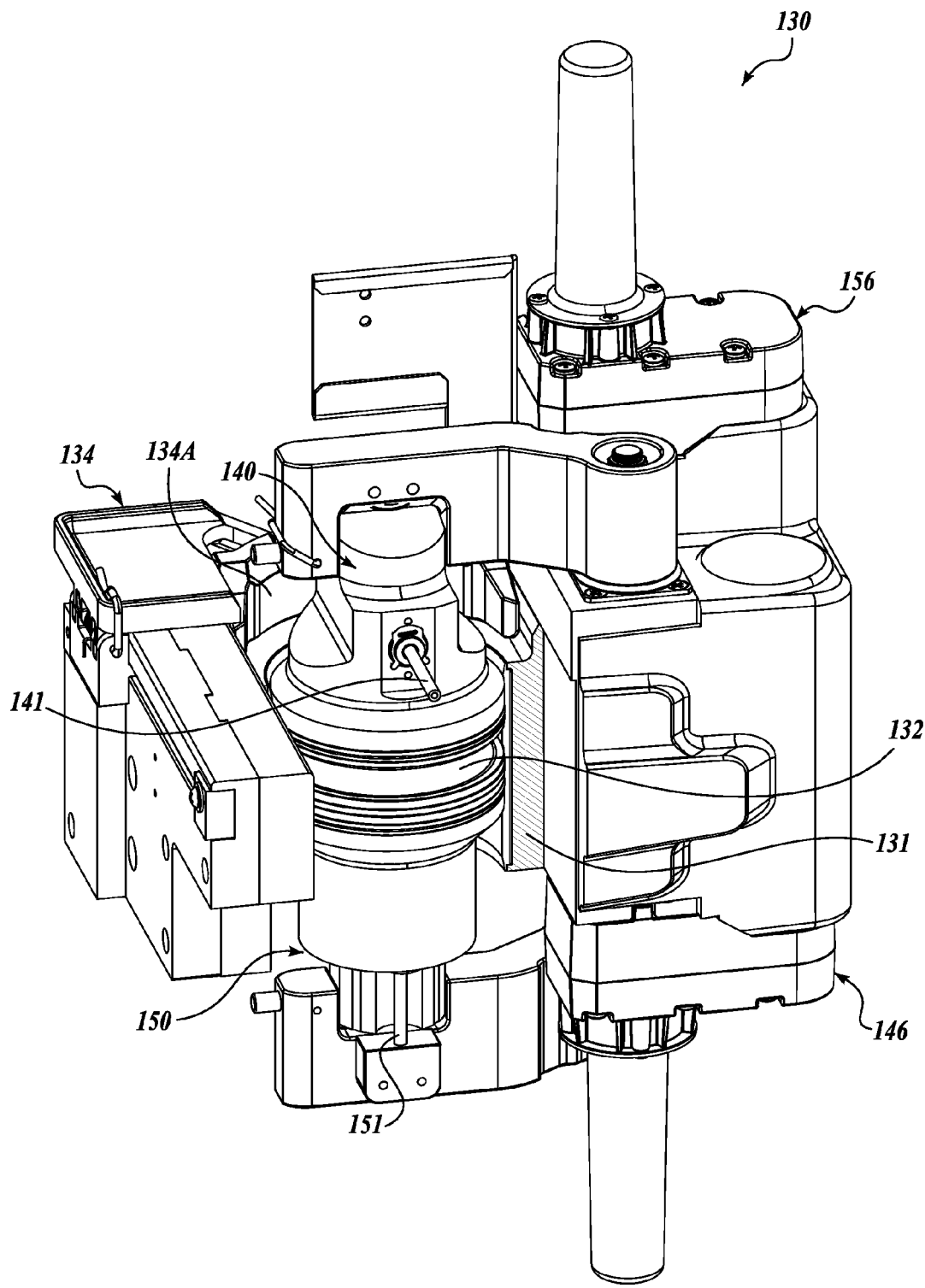

FIG. 6C shows the brew group 130 wherein the lower piston assembly 150 has been moved upwardly part way through brewing chamber 132. In the first mode of operation, one or more valves (not shown) redirect the flow to a drain that is preferably plumbed into the system 100. In the second mode of operation, the upward movement of the lower piston assembly 150 dispenses the brewed liquid. In either case, the now spent brewed material is compressed between the upper piston assembly 140 and the lower piston assembly 150, such that a significant portion of the water is removed.

Figure 6D:
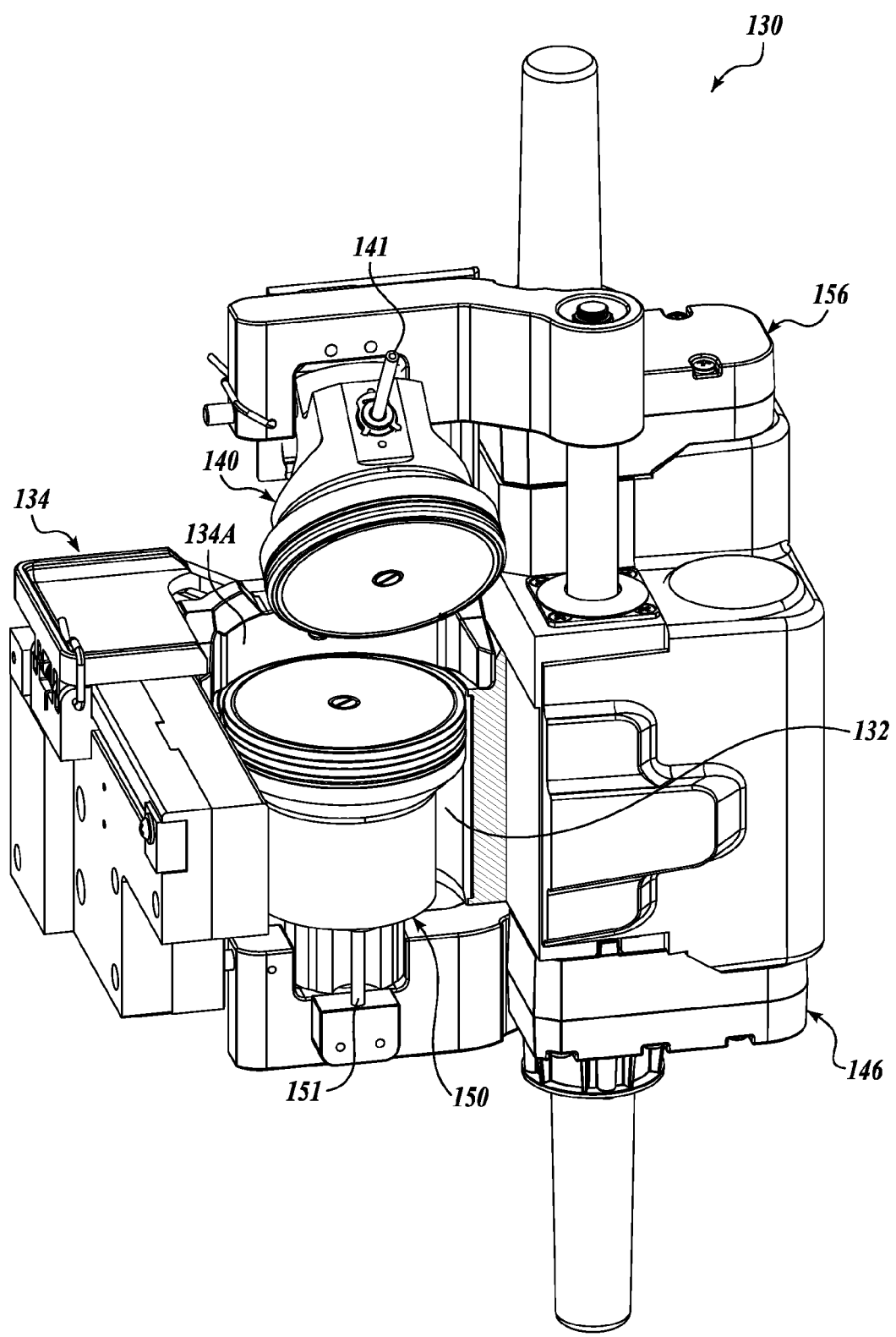

Referring now to FIG. 6D, the upper piston assembly 140 is moved upwardly to disengage from the brewing chamber 132 and pivots to the load position. The lower piston assembly 150 is moved upwardly such that the piston is approximately flush with the upper surface of the block assembly 131. The compressed spent grounds are therefore positioned to be removed, and the upper piston assembly 140 is moved out of the way of the sliding arm assembly 134.

Figure 6E:
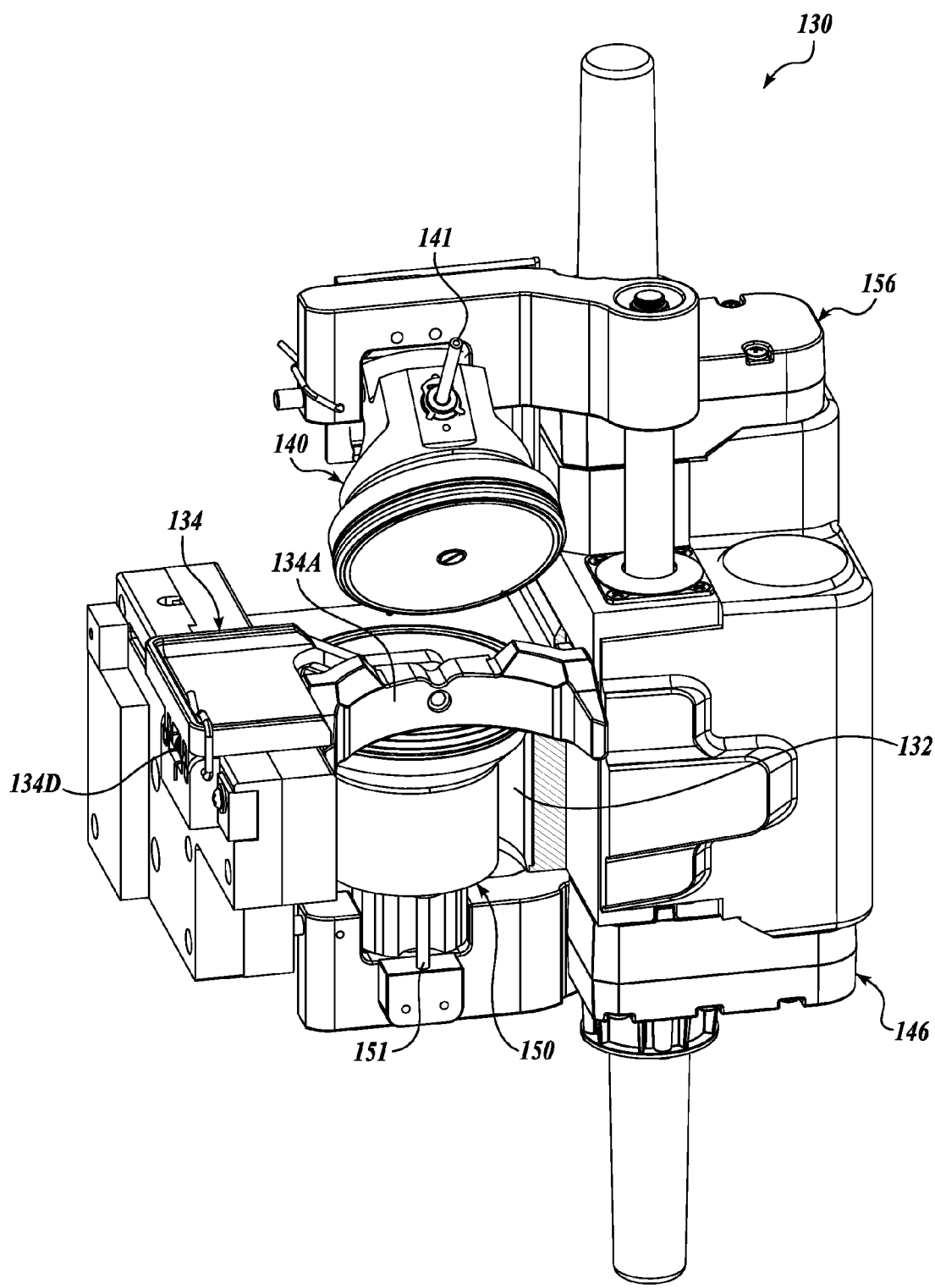

FIG. 6E shows the sliding arm assembly 134 after sliding the C-shaped arm 134A over the brewing chamber 132 to remove the spent grounds. The system 100 may include an internal repository or chute for the spent grounds, or may be positioned over an external repository positioned to receive the grounds. The sliding arm assembly 134 may then be retracted, to return to the ready position shown in FIG. 6A.

From the above description, it will be appreciated that the currently preferred system provides for a liquid flow through the brewing chamber 132 that is initiated with heated water entering through the lower piston assembly 150 at the bottom of the brewing chamber 132, and brewed liquid exiting through the upper piston assembly 140. Although not preferred, it will be apparent to persons of skill in the art that with straightforward changes, the present invention may be practiced with the liquid flow proceeding in the opposite direction.

Figure 7:
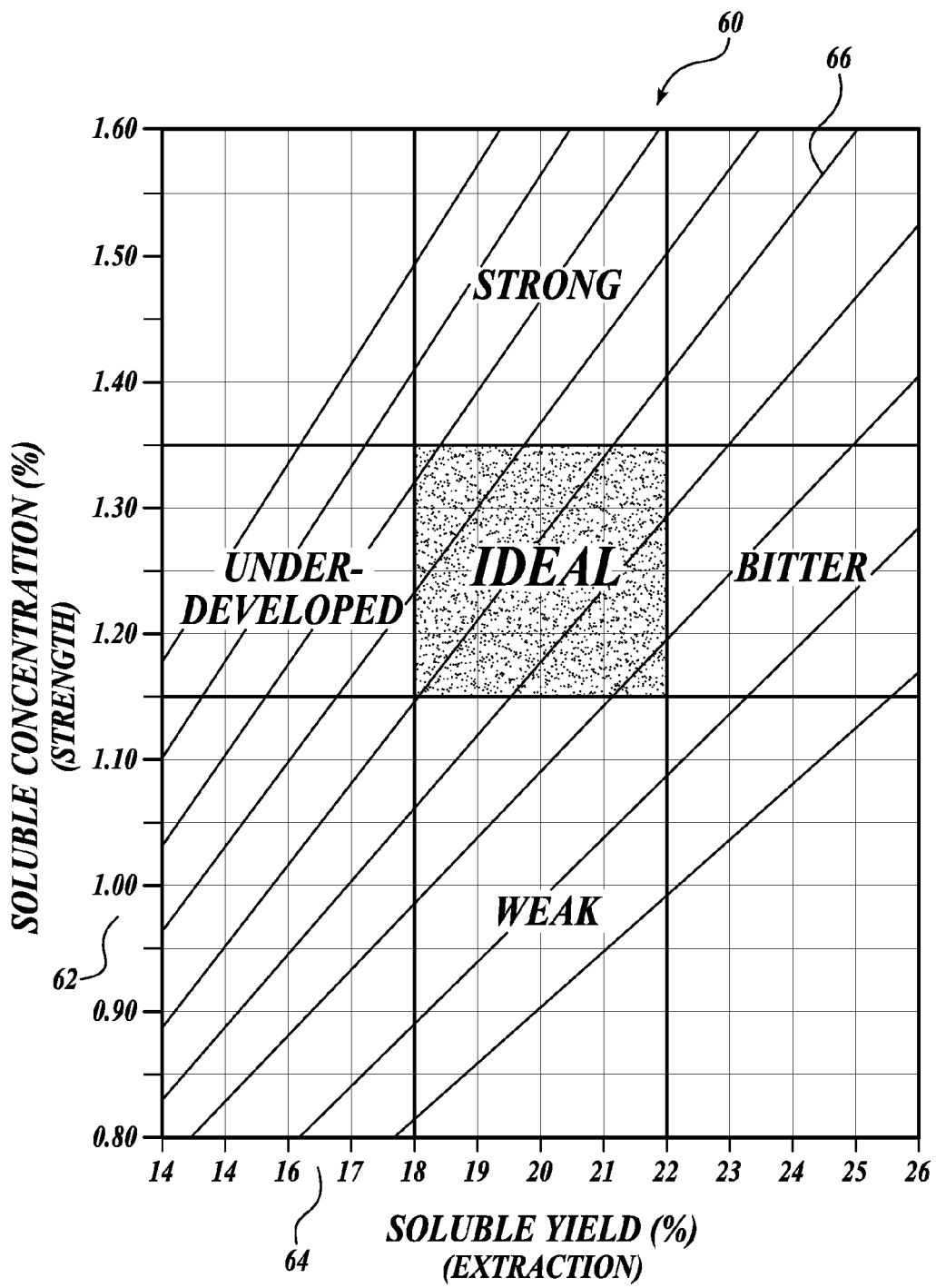
FIG. 7 illustrates the Coffee Brewing Control Chart.

FIG. 7 shows a conventional Coffee Brewing Control Chart 60, attributed to Dr. E. E. Lockhart. The Control Chart 60 relates the soluble concentration or strength 62 in a brewed coffee liquid (a measure of the total dissolved solids in the liquid) to the soluble yield or extraction 64 from the coffee that generated the coffee liquid. Under this Control Chart, a coffee liquid having less than 1.15% soluble concentration will have a "Weak" flavor, and coffee having greater than 1.35% soluble concentration will have a "Strong" flavor. If less than 18% of the solubles are extracted from the brewed coffee then the flavor of the coffee liquid will be "Underdeveloped," but if more than 22% of the solubles are extracted from the brewed coffee then the flavor will be "Bitter." Therefore, the Control Chart defines an "Ideal" flavor region within these bounds. The diagonal curves indicate particular "brewing formulas," i.e., the ratio of ground coffee (e.g., in ounces) to water brewed (e.g., in gallons). The line 66, for example, corresponds to a ratio of 7.5 oz of coffee to one gallon of water. Lines to the right and below line 66 indicate progressively lower coffee-to-water ratio formulae, and lines to the left and above line 66 indicate progressively higher coffee-to-water ratio formulae.

Therefore, if the brewing formula is known, and the total dissolved solids ("TDS") in the brewed liquid is known, the beverage location on the on the Control Chart 60 can be precisely determined. It should be appreciated that the Control Chart provides a guideline for producing a high quality coffee beverage, and that the preferred coffee liquid strength and extraction parameters are not necessarily in the center of the "Ideal" box in the Control Chart. In practice, it may be desirable to determine the strength and extraction parameters that are optimal for a particular coffee blend, e.g., a preferred location on the Control Chart 60, and then to control the brewing cycle parameters to target those optimal values. It will also be appreciated that personal preferences may differ. For example, one person may prefer a beverage that is nearer the top of the "Ideal" box, whereas another user may prefer a beverage relatively lower in the "Ideal" box.

It will be appreciated, as alluded to above, that the strength and extraction of a brewed beverage may be controlled or modified through different parameters in the brewing process, for example by adjusting one or more of (i) the coffee to water formula, (ii) the brewing time, (iii) the water temperature, (iv) the water pressure, (v) the grind size, etc. The optimal strength and extraction targets will also generally be dependent on the particular blend or brand of coffee. Although the Control Chart 60 is specifically directed to brewing coffee, it is contemplated that very similar methods may be used to characterize the quality of other brewed liquids, for example particular teas.

One difficulty in using the Control Chart 60 in an automated brewing system such as the system 100, is that the strength or TDS in the brewed liquid in the Control Chart is the final or batch value at the end of the brewing cycle. This batch value is typically inconvenient or difficult to obtain.

Figure 8:
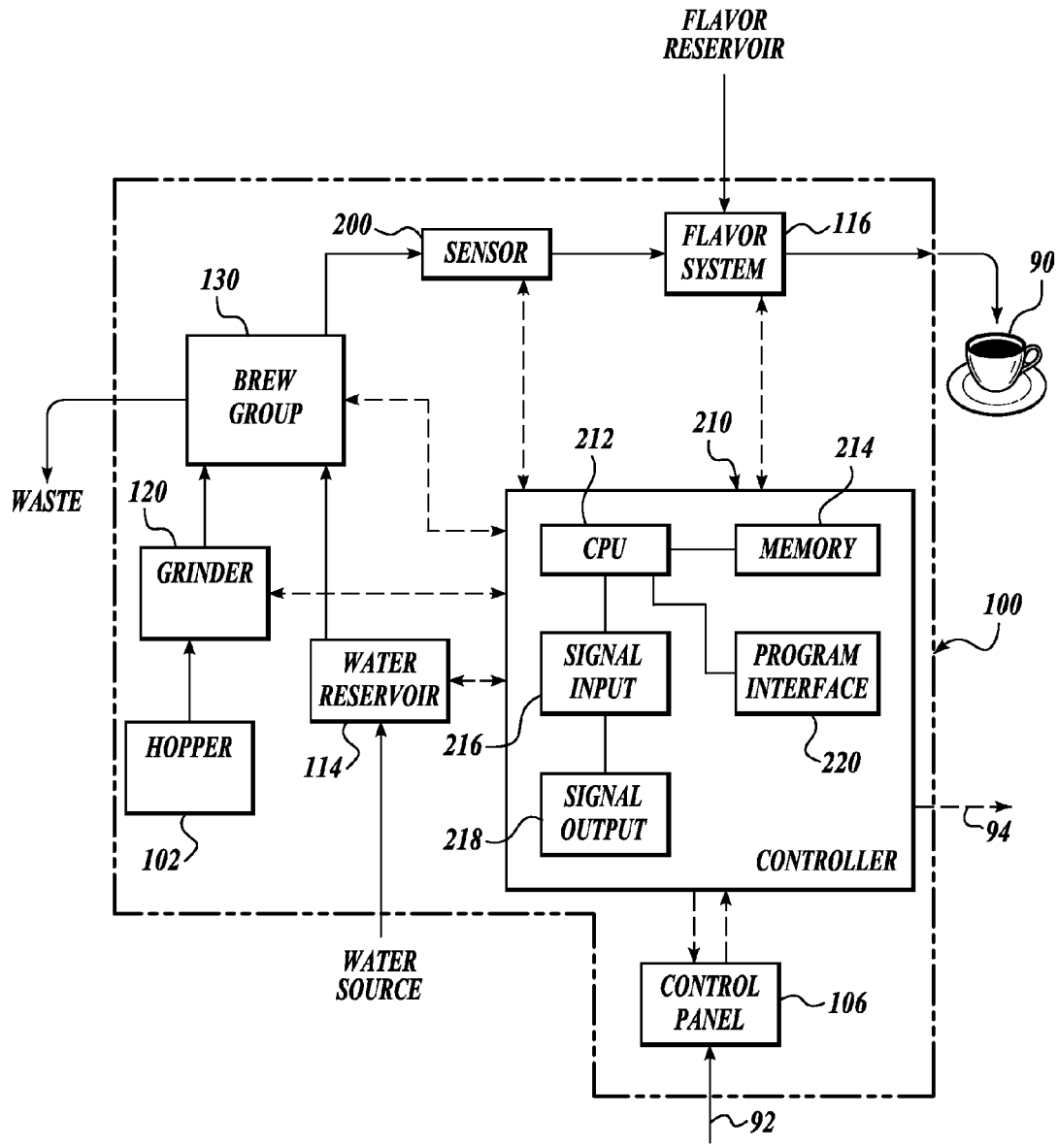
FIG. 8 is a simplified block diagram of the brewing system shown in FIG. 1.

FIG. 8 illustrates a simplified block diagram of the brewing system 100, showing the hopper 102, water reservoir 114, grinder assembly 120, and brew group 130 described above. An inline sensor or sensor array 200 is fluidly connected to the dispensing tube 141, such that the brewed liquid flows by or through the sensor array 200. (As used herein, a sensor array may include a single sensor or a plurality of sensors.) The sensor array 200 measures properties of the brewed liquid at a particular inline location along the flow path, as the brewed liquid flows from the brew group 130 towards the dispensing container 90. The sensor array 200, therefore, will produce a time-dependent output showing the measured property of the liquid stream as it flows by the sensor array 200. In a current embodiment the sensor array 200 is located along the fluid path shortly downstream of the brew group 130, although other locations are also contemplated, including at the brewed liquid dispensing station.

The sensing array 200 provides specific data regarding qualities of the brewed liquid that may be used, for example, to monitor the quality of the beverage. The data provides feedback that may be used to initially configure particular settings of the system 100, and/or to monitor each brew to provide feedback that may be used to adjust brew parameters to maintain optimal product quality.

A controller 210, which in this embodiment includes a programmable processor 212, a memory module 214, a plurality of data input ports 216, a control signal generator 218, and a program interface module 220, is in signal communication with the sensor array 200. The controller 210 may additionally be in signal communication with other components of the brewing system, as indicted by the dashed lines in FIG. 8.

The sensor array 200 produces unsteady or time-dependent signals preferably over the entire period that the brewed liquid passes through or by the sensor array 200. The signals represent a measured property of the brewed liquid. The unsteady signals are transmitted to the controller 210. Additional data may also be transmitted to the controller 210, for example data from other system components such as the grinder 120, water supply 114, etc. For example, temperature sensors (e.g., a brewing chamber temperature thermocouple) may provide information that is useful for interpreting data from the sensor array 200. Similarly, the current grinder setting may be transmitted to the controller 210.

In a particular embodiment external data may also be provided to the controller 210. For example, the coffee blend and/or brand may be provided using a reader (e.g., barcode or RF system, etc.) that obtains data from coffee packaging, and transmits the data to the controller 210.

The controller 210 processes the received data, and uses the data to generate control signals to adjust one or more brewing parameters to achieve a desired and consistent brew quality. For example, the grind time (i.e., quantity of ground coffee), grind size, hot water temperature, brewing pressure, and brew time are all potentially adjustable parameters.

The controller 210 may further include a communications port 94, for example with wired or wireless connection to a network (not shown), such that sensor array 200 data and related information (e.g., TDS/strength, brewing formula, extraction, etc.) and the state of various brew parameters may be reported out. For example, the quality of each brewed beverage (e.g., strength and extraction) may be reported and recorded, to verify that the desired quality is consistently maintained in the "gold cup" box of FIG. 7.

Figure 9:
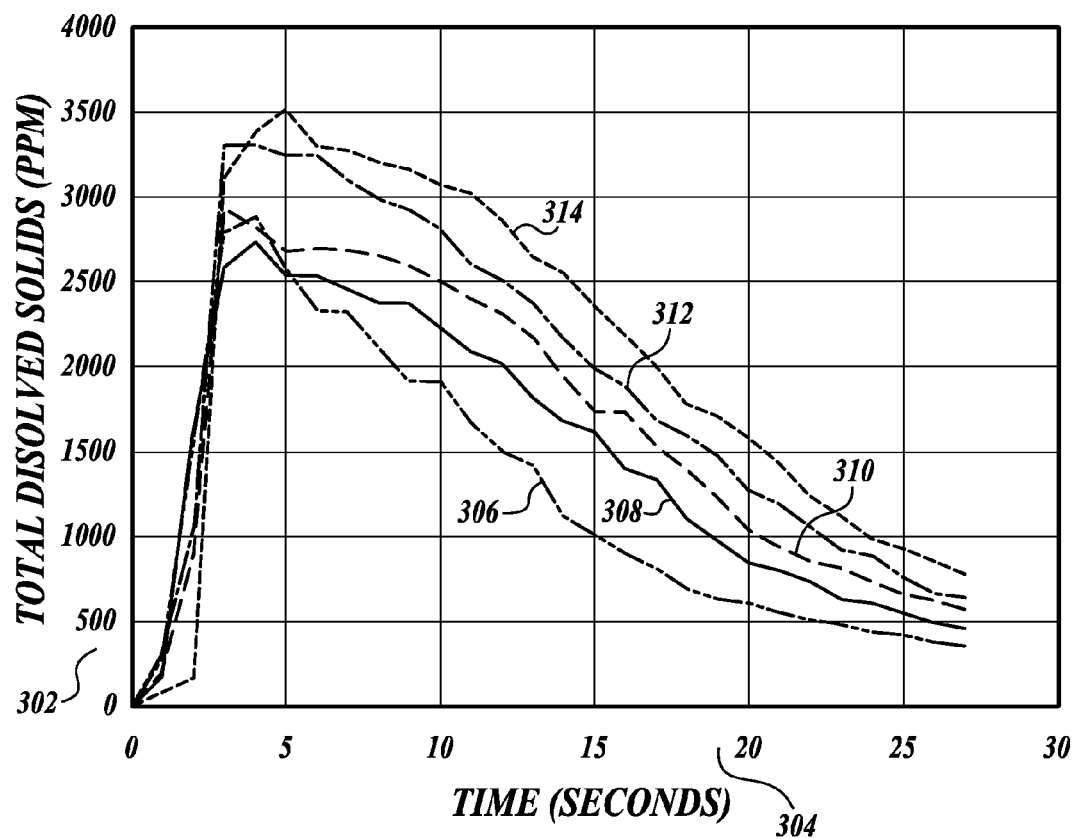
FIG. 9 illustrates graphically output data from an embodiment of the sensor array for the system shown in FIG. 9, that includes a TDS meter.

FIG. 9 illustrates graphically output data from an embodiment of the sensor array 200 that includes a TDS meter, for example a conductivity meter calibrated to indicate the level of total dissolved solids in the fluid stream. In this example the individual curves relate the measured TDS 302 as a function of time 304 as measured by the sensor array 200 during the beverage dispensing cycle. The curves show the measured results for different brewing formulas, wherein the quantity of ground coffee deposited into the brewing chamber 132 was varied. In this exemplary graph, curve 306 shows the unsteady TDS measurement using 14.9 g of coffee, curve 308 shows the unsteady TDS measurement using 18.5 g of coffee, curve 310 shows the unsteady TDS measurement using 22.5 g of coffee; curve 312 shows the unsteady TDS measurement using 26.0 g of coffee, and curve 314 shows the unsteady TDS measurement using 29.7 g of coffee, all with a predetermined amount of water.

It will be appreciated that the batch value of the TDS in the brewed liquid can be determined by suitably integrating the flow-weighted measured TDS over time. For example, if the flow rate is constant during the dispensing cycle measurement, then the batch TDS will be the average of the measured TDS during the dispensing cycle. It is contemplated that the sensor array 200 may further include a temperature sensor. The temperature can affect the measured TDS when a conductivity sensor is used, and therefore for improved accuracy the conductivity measurement for TDS may be adjusted to account for temperature.

It will also be appreciated that the shape of the time-dependent curves, or "coffee signature" data, provides additional information regarding the coffee and the brewed coffee liquid. The shape of the curves provides information regarding the rate that the solids are dissolved from the coffee matrix. This coffee signature data may be used to guide which of the various parameters in the brewing cycle should be adjusted to improve the quality of the brewed liquid. For example, in order to move the system towards a desired point on the Control Chart 60, the system may elect to either add more coffee to the brewing formula, or may adjust to a finer grind of the coffee. An automated optimization strategy may be readily determined heuristically and then programmed into the controller 210 for subsequent brews. It will be appreciated that the heuristic formulation may be developed independently for different coffee blends, for example.

Figure 10:
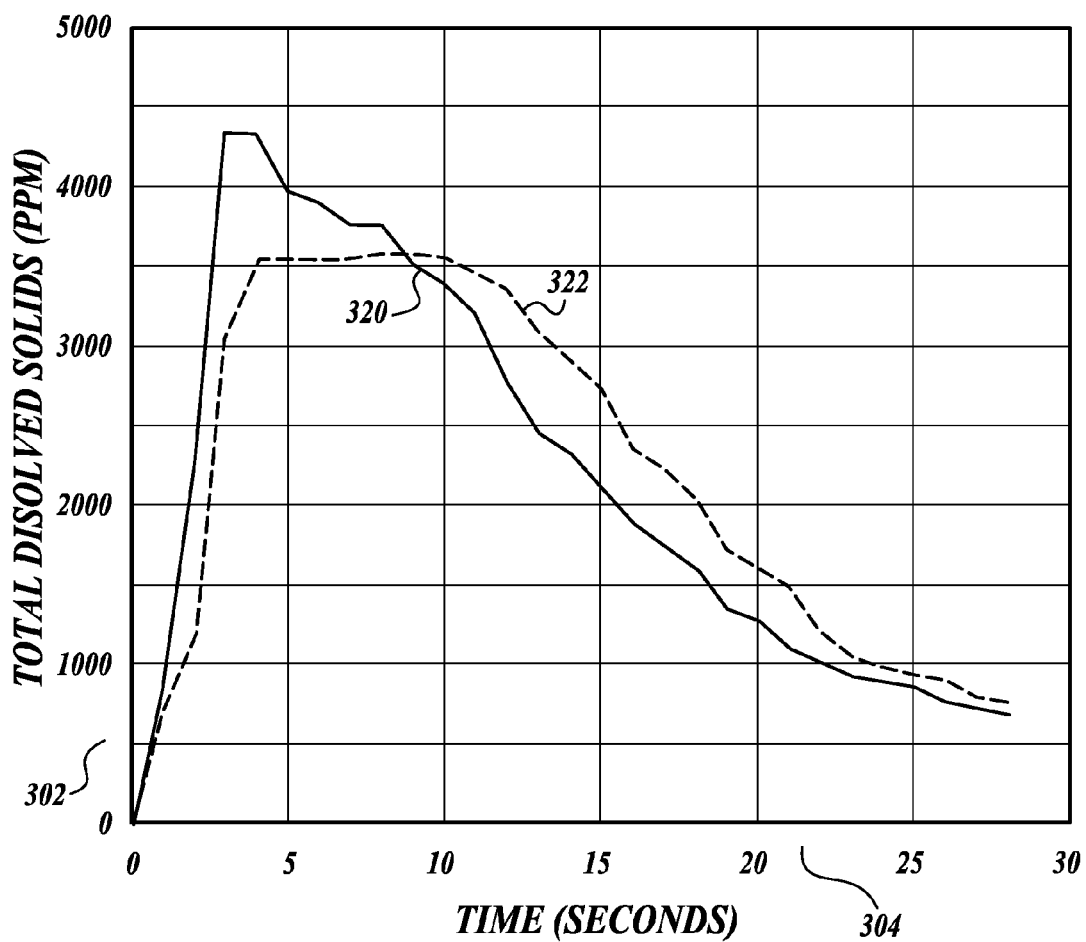
FIG. 10 illustrates TDS curves from the sensor array of FIG. 9, showing curves for different coffee blends.

It is also contemplated that the coffee signature data may be used to determine the specific type, blend, or brand of coffee present in the system 100. For example, data from the sensing array 200 may be used to distinguish between different coffee bean species such as coffea Arabica (commonly referred to as "Arabica") and coffea canephora (commonly referred to as "Robusta"), and to identify subvarieties, types, and particular blends of coffee. FIG. 10 illustrates TDS curves from the sensor array 200, wherein curve 320 is for one coffee blend, and curve 322 is for another different coffee blend. The brewing parameters and brewing formula were the same for both curves 320, 322. The data from the sensing array 200 may therefore be used to identify the blend of coffee being used. Identifying the blend of coffee may further be used to customize and optimize the brewing parameters for the particular coffee blend (for subsequent brew cycles).

In a particular embodiment, the memory module 214 is provided with a database of coffee signature curves, or family of curves, and the processor 212 compares the measured coffee signature data with the database of curves, to identify the coffee blend, and/or to determine if the coffee blend is in a particular group or family.

In addition, identifying the coffee blend may be important to ensuring that the intended blend or brand of coffee is used in a particular brewer apparatus. In some business models for providing coffee in commercial settings, for example, a coffee vendor may provide the brewing equipment at little or no cost, relying on the sales of consumables to make the business model work. The ability to identify that the coffee being used in the brewing equipment is from the vendor is important in such situations.

The time-dependent data may also be used to identify and provide diagnostic information if maintenance is required. For example, the time-dependent data may indicate that the ground coffee is not achieving the desired particle size, indicating maintenance or adjustment of the grinders may be needed.

As noted above, the taste preferences of users will vary. Most users will prefer a brewed coffee, for example, to be within the "Ideal" box in FIG. 7, but the preferred location within that box may be different from person to person. It is contemplated, as indicated in FIG. 8, that the user may input 92 a desired beverage from the control panel 106 of the brewing system. The input may include a mechanism for selecting within a range a desired brewing parameter. For example, a user may select a level of "strength," to adjust the target TDS in the brewed liquid. In another example, the control panel 106 may display a chart such at the Control Chart 60 (FIG. 7) and allow the user to select a two-dimensional location on the Control Chart 60 for a brewed coffee beverage. The controller 210 will then take the user input, and adjust the brewing parameters to achieve the target quality. Because the sensor array 200 is disposed inline with the brewed liquid, the brewing system 100 may also be configured to report or display to the user (e.g., on the control panel 106) the measured results, for example displaying measured TDS and/or temperature, or displaying the location on the Control Chart 60 based on the sensor array output and the brewing parameters.

The disclosed apparatus and method is new and unique in that it describes, for a beverage dispensing system, a method and apparatus to sense and measure the continually varying time-based signature of physical characteristics in the brewed liquid stream. The resulting signature provides: a) a means for predicting the end-item in-the-cup beverage quality; b) a means for monitoring in-process beverage production and means of adjustment, or correction of beverage quality; c) a means for monitoring system 100 performance and maintenance needs; d) a means for protecting brand integrity, such as with a coffee roaster or gourmet tea producer; and e) a means for providing system 100 calibration, either manually, or automatically.

It is contemplated that one or more visible and non-visible light wavelength sensors, along with temperature sensors in several locations may be used to provide both means for monitoring beverage properties, e.g., temperature. In particular, one or more near-infrared sensors have been found useful. Other suitable sensors contemplated include acoustic sensors.

Multiple sensors of the same type, for example, two near-infrared sensors, can be employed in the array to provide redundancy and improved signal-to-noise characteristics. Additionally, if multiple visible light sensors are employed, they may, or may not, be of the same wavelength, if it is desired to observe different brew-stream characteristics. In its current embodiment, temperature sensors are also placed to monitor the equipment temperatures, such as the brew chamber 132.

For example, the present method may include the following steps:

1) The brewed liquid stream is configured to pass through, or by, the sensor array 200.

2) The system electronics capture the output of the sensor array 200.

3) The time-based signature is then analyzed and/or correlated, via signature comparison, numerical algorithm, look-up table, or the like, to known, or desired, beverage quality standards (such as a refractometer or total dissolved solids) for the end-batch.

Additional features and advantages of particular embodiments of the present invention include:

a. Prediction of in-the-cup beverage quality to the consumer. The brewing system 100 provides a means for verifying that a consistent "Gold Cup" standard beverage or the like has been produced, and may be configured to transmit results from the sensor array 200 to alert others if maintenance is required, for example.

b. Enables in-process monitoring and means of adjustment to maintain in-cup-beverage quality. Comparing the signature and/or analysis results and making adjustments, such as adding more ground coffee, or adjusting coffee grinders 130, temperature, etc., to obtain the "Gold Cup" coffee beverage consistently.

c. Enables pro-active means for establishing system 100 maintenance needs.

d. Protection of Brand Integrity. A high-value brand utilizing the present system 100, with their various coffee roasts, each having a unique brew-stream signature. The system 100 will be able to determine if other brands, or lesser-quality coffee products were substituted, and appropriate action could take place, such as shutting down of the system 100.

e. Enable self-calibration of system 100 when different product, such as different coffee roast, or blend, is introduced.

While illustrative embodiments have been illustrated and described, it will be appreciated that various changes can be made therein without departing from the spirit and scope of the invention.

The embodiments of the invention in which an exclusive property or privilege is claimed are defined as follows:

1. A brewing system comprising:
    a hopper configured to dispense brewable product;
    a reservoir configured to dispense heated water;
    a brewing chamber that receives brewable product from the hopper, and receives heated water from the reservoir, wherein the brewing chamber is configured to produce a brewed liquid from the received brewable product and heated water and to dispense the brewed liquid in a fluid stream;
    a controller that controls the operation of the brewing system, the controller comprising a processor, an input signal port, an output signal port, and a memory module;
    a sensor positioned to intercept the fluid stream, and operable to measure a property of the brewed liquid at a fixed location as the brewed liquid flows by the sensor, wherein the sensor generates time-dependent data corresponding to the measured property, and communicates the time-dependent data to the controller;
    wherein the controller uses the time-dependent data to control the amount of brewable product received by the brewing chamber.

2. The brewing system of claim 1, wherein the controller uses the time-dependent data to identify the brewable product.

3. The brewing system of claim 1, wherein the controller uses the time-dependent data to identify if there is a need to service the brewing system.

4. The brewing system of claim 1, wherein brewable product comprises coffee and wherein the system further comprises a coffee grinder configured to grind coffee from the hopper.

5. The brewing system of claim 4, wherein the sensor measures total dissolved solids in the brewed liquid.

6. The brewing system of claim 5, further comprising means for displaying the measured total dissolved solids in the brewed liquid.

7. The brewing system of claim 4, wherein the controller is in signal communication with the grinder, and further wherein the controller uses the time-dependent data to control the operation of the grinder.

8. The brewing system of claim 1, wherein the sensor comprises a conductivity sensor.

9. The brewing system of claim 1, wherein the brewing chamber comprises a cylindrical chamber and is part of a brew group further comprising a lower piston that is attached to a first linear actuator and sealably engages an open lower end of the brewing chamber, an upper piston assembly that is attached to a second linear actuator and sealably and releasably engages an open upper end of the brewing chamber, and a sliding arm assembly that is attached to a third linear actuator and is operable to slide over the open upper end of the brewing chamber.

10. The brewing system of claim 1, wherein the controller further uses the time-dependent data to identify the brand of the brewable product.

11. The brewing system of claim 4, wherein the controller further uses the time-dependent data to identify the brand of the coffee.

12. The brewing system of claim 1, further comprising means for displaying a quality of the brewed beverage based on property of the brewed liquid measured by the sensor.

13. A method for producing a brewable beverage in a brewing system having a controller and a sensor, the method comprising:
grinding coffee beans with a grinder to produce a brewable product;
providing a quantity of the brewable product to a brewing chamber;
providing a quantity of heated water to the brewing chamber;
permitting the brewable product to brew in the heated water in the brewing chamber to produce a brewed liquid;
forcing at least a portion of the brewed liquid from the brewing chamber in a fluid stream;
measuring a property of the brewed liquid with the sensor at a fixed location as the fluid stream flows by the fixed location, to generate a time-dependent data set for the fluid stream corresponding to the measured property, the measured property comprising the total dissolved solids in the brewed liquid; and
using the time-dependent data set to control the operation of the grinder.

14. The method of claim 13, wherein the time-dependent data set is used by the controller to evaluate a quality of the dispensed brewed liquid.

15. The method of claim 13, wherein the time-dependent data set is used by the controller to control at least one brewing parameter of the brewing system.

16. The method of claim 13, wherein the time-dependent data set is used by the controller identify the brand of the brewable product.

17. The method of claim 13, wherein the time-dependent data set is used by the controller to identify if the brewing system is in need of maintenance.

18. The method of claim 13, wherein the sensor is a conductivity meter.

19. The method of claim 13, wherein the brewing chamber is a part of a brew group that further comprises a lower piston that is attached to a first linear actuator and sealably engages an open lower end of the brewing chamber, an upper piston assembly that is attached to a second linear actuator and sealably and releasably engages an open upper end of the brewing chamber, and a sliding arm assembly that is attached to a third linear actuator and is operable to slide over the open upper end of the brewing chamber.

20. A brewing system comprising:
a hopper configured to dispense coffee beans;
a coffee grinder configured to receive and grind coffee beans from the hopper to produce a brewable product;
a reservoir configured to dispense heated water;
a brewing chamber configured to receive the brewable product from the grinder, and to receive heated water from the reservoir, wherein the brewing chamber is configured to produce a brewed liquid from the received brewable product and heated water and to dispense the brewed liquid in a fluid stream;
a controller that controls the operation of the brewing system, the controller comprising a processor, an input signal port, an output signal port, and a memory module;
a sensor positioned to intercept the fluid stream, and operable to measure a property of the brewed liquid at a fixed location as the brewed liquid flows by the sensor, wherein the sensor generates time-dependent data corresponding to the measured property, and communicates the time-dependent data to the controller;
wherein the controller is in signal communication with the grinder, and further wherein the controller uses the time-dependent data to control the operation of the grinder.

21. A brewing system comprising:
a hopper configured to dispense brewable product;
a reservoir configured to dispense heated water;
a brewing chamber that receives brewable product from the hopper, and receives heated water from the reservoir, wherein the brewing chamber is configured to produce a brewed liquid from the received brewable product and heated water and to dispense the brewed liquid in a fluid stream;
a controller that controls the operation of the brewing system, the controller comprising a processor, an input signal port, an output signal port, and a memory module;
a sensor positioned to intercept the fluid stream, and operable to measure a property of the brewed liquid at a fixed location as the brewed liquid flows by the sensor, wherein the sensor generates time-dependent data corresponding to the measured property, and communicates the time-dependent data to the controller;
wherein the brewing chamber comprises a cylindrical chamber and is part of a brew group further comprising a lower piston that is attached to a first linear actuator and sealably engages an open lower end of the brewing chamber, an upper piston assembly that is attached to a second linear actuator and sealably and releasably engages an open upper end of the brewing chamber, and a sliding arm assembly that is attached to a third linear actuator and is operable to slide over the open upper end of the brewing chamber.

22. A method for producing a brewable beverage comprising:
providing a quantity of brewable product to a brewing chamber;
providing a quantity of heated water to the brewing chamber;
permitting the brewable product to brew in the heated water in the brewing chamber to produce a brewed liquid;
forcing at least a portion of the brewed liquid from the brewing chamber in a fluid stream;
measuring a property of the brewed liquid at a fixed location as the fluid stream flows by the fixed location, to generate a time-dependent data set for the fluid stream corresponding to the measured property;
wherein the brewing chamber is a part of a brew group that further comprises a lower piston that is attached to a first linear actuator and sealably engages an open lower end of the brewing chamber, an upper piston assembly that is attached to a second linear actuator and sealably and releasably engages an open upper end of the brewing chamber, and a sliding arm assembly that is attached to a third linear actuator and is operable to slide over the open upper end of the brewing chamber.

23. A method for producing a brewable beverage comprising:
providing a quantity of brewable product to a brewing chamber;
providing a quantity of heated water to the brewing chamber;
permitting the brewable product to brew in the heated water in the brewing chamber to produce a brewed liquid;
forcing at least a portion of the brewed liquid from the brewing chamber in a fluid stream;

measuring a property of the brewed liquid at a fixed location as the fluid stream flows by the fixed location, to generate a time-dependent data set for the fluid stream corresponding to the measured property;

using the time-dependent data set to control the amount of brewable product that is provided to the brewing chamber.

* * * * *

UNITED STATES PATENT AND TRADEMARK OFFICE
CERTIFICATE OF CORRECTION

PATENT NO. : 8,623,441 B2
APPLICATION NO. : 13/050852
DATED : January 7, 2014
INVENTOR(S) : J. M. McLaughlin et al.

Page 1 of 1

It is certified that error appears in the above-identified patent and that said Letters Patent is hereby corrected as shown below:

In the Claims

| COLUMN | LINE | ERROR |
|---|---|---|
| 13 | 35 | "the controller identify" should read |
| (Claim 16, | line 2) | --the controller to identify-- |

Signed and Sealed this
Third Day of June, 2014

Michelle K. Lee
*Deputy Director of the United States Patent and Trademark Office*